March 30, 1943.    G. A. TINNERMAN    2,315,359
NUT FASTENING DEVICE
Filed Sept. 1, 1939
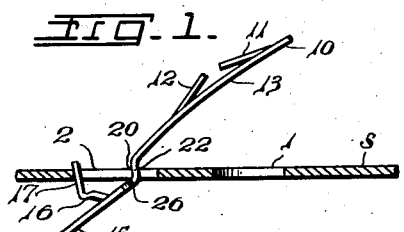
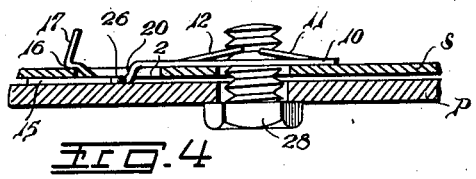
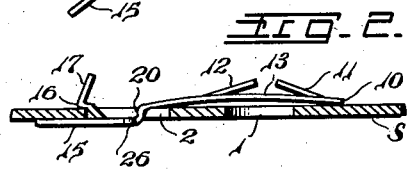
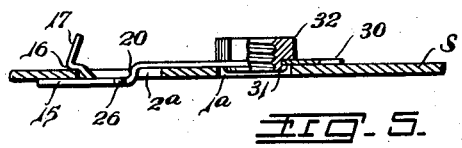
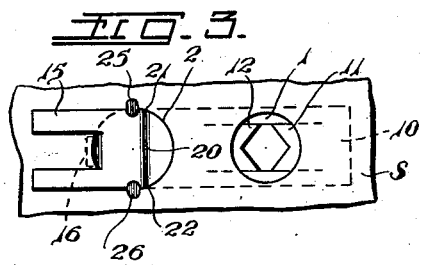
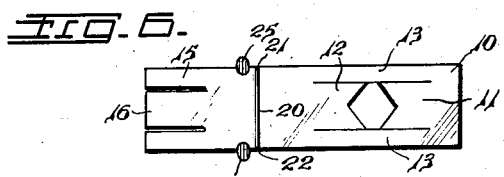
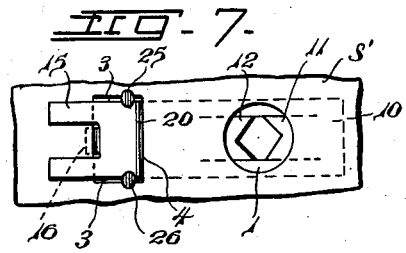
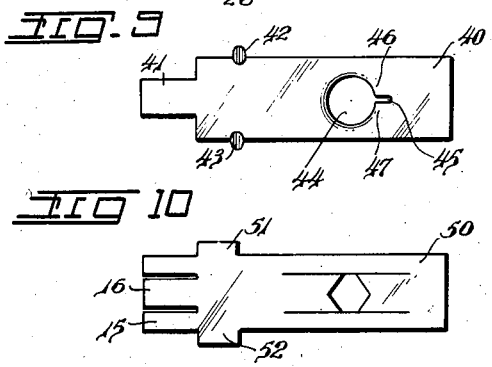
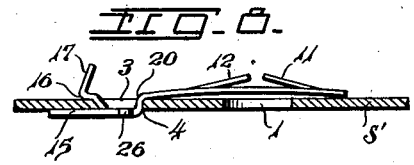
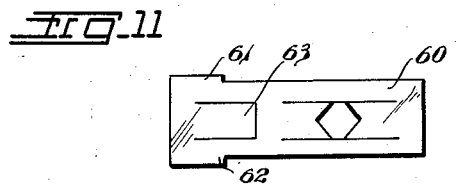
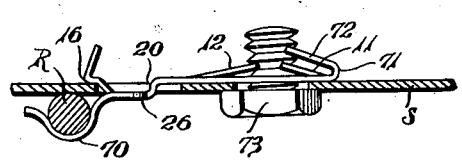
Inventor
GEORGE A. TINNERMAN
By H. G. Lombard
Attorney Patented Mar. 30, 1943

2,315,359

UNITED STATES PATENT OFFICE 2,315,359

NUT FASTENING DEVICE

George A. Tinnerman, Cleveland, Ohio, assignor, by mesne assignments, to Tinnerman Products, Inc., Cleveland, Ohio, a corporation of Ohio Application September 1, 1939, Serial No. 293,108

9 Claims. (Cl. 85—32)

This invention relates to fastening devices of general utility designed especially for ready application to an apertured supporting structure to provide the same with means for securing a cooperating part thereto or for the purpose of securing another structure, object or article of manufacture to said supporting structure. The present application is a continuation in part of prior copending application Serial Number 119,415 filed January 7, 1937 and since issued as Patent Number 2,222,449, November 19, 1940.

In the fabrication of sheet metal structures, it is well known that the attachment of ordinary sheet metal parts by means of screws threaded in openings provided therein is generally inefficient and unsatisfactory in that the walls of the openings thus provided are of insufficient thickness to form suitable threads with which a bolt or screw fastening may threadedly engage and be secured effectively. Also, it is usually impractical to tighten a threaded member in such an opening since the thread engaging elements thereof are easily deformed and mutilated by the axial drawing action incident to tightening thereby causing the opening to become enlarged to the extent that the threaded member is loose in its final applied position and subject to unscrewing and displacement.

The present invention is directed, more particularly, to an improved form of sheet metal fastening device usable in the manner of a substantial nut member and provided with means by which the same may be readily attached to a supporting structure in proper position to receive a screw fastener for securing a cooperating part or object to the supporting structure. In this respect, the devices of the present invention are particularly designed for use in what are known as blind fastening installations in which there is access to only one side or face of the supporting structure or equivalent member carrying the nut, whereupon it becomes necessary for the nut device to be applied to fastening position entirely from the accessible side of the support preparatory to the application of the bolt or other screw threaded fastener thereto. One of the most important uses of such fastening devices takes place in the mounting of fenders on automobiles inasmuch as access to the interior of the car body is usually impractical or impossible and the only practicable method of mounting the fenders to the vehicle body as it moves on an assembly line, is by an operation in which the nut devices are applied to fastening position from the outside of the car body with the complementary bolt fastenings subsequently threaded therewith also applied from outside the car body in securing the fenders in fully mounted position.

A primary purpose of the invention, therefore, is to provide a sheet metal fastening device of this character that may be inexpensively constructed with an improved type of attaching means by which the device may be easily and quickly applied to fastening position in interlocked engagement with the supporting structure, and retained in such fastening position against inadvertent disconnection or accidental removal without the use of extraneous bolts, screws, rivets, welding, or the like attaching means.

Another principal obejct of the invention is to provide an improved arrangement for interlocking such a sheet metal fastening device in applied position at the rearward side of a supporting part by an operation taking place entirely from the forward side thereof, the fastening device comprising, generally speaking, an attaching spring arm on the fastener body which is receivable in an assembling opening in said structure and the fastener positioned in substantially locked relation therewith by a substantial snap fastening engagement of said spring arm in said opening, whereby the fastener is fixedly and rigidly retained on said structure in position to receive a threaded fastener for securing a cooperating part thereto or for mounting an object or article of manufacture thereon.

A more specific object is for the provision of a sheet metal nut fastening device of the kind described provided with an improved form of attaching means comprising an attaching spring arm adapted to cooperate with means on the fastener body to hold the fastening device in applied position on the supporting structure, said fastener body being receivable in an assembling opening in the supporting structure from the forward side thereof and advanced by a substantial canting or tilting movement to final applied position at the rearward side of the supporting structure wherein said spring arm is effective to retain the fastening device in substantially locked assembled relation thereon.

Still another object is to provide a fastening device having such an attaching means in which the spring arm, in the applied fastening position of the device, is provided with a substantial shoulder designed to engage an adjacent edge of the assembling opening in the supporting structure to prevent retrograde movement and inadvertent disconnection or displacement of the fastening device from its final applied fastening position.

Further objects and advantages, and other new and useful features in the construction, arrangement and general combination of parts of the invention will be readily apparent to those skilled in the art as a description thereof proceeds with reference to the accompanying drawing, in which like reference characters designate like parts throughout the same and in which:

Fig. 1 is an edge view of the fastening device and illustrates the initial step in the application thereof to fastening position at the rearward side of a supporting structure, represented in section;

Fig. 2 is a similar view showing the fastening device in final applied fastening position on the supporting structure;

Fig. 3 is a plan view from the underside of Fig. 2;

Fig. 4 is a view of the fastening device similar to Fig. 2 and showing a bolt fastening applied thereto for securing a cooperating part to the supporting structure;

Fig. 5 is a vertical sectional view of a modified form of nut fastening device embodying a conventional threaded nut;

Fig. 6 represents one form of blank from which the fastening device of Figs. 1–4 inclusive may be constructed;

Fig. 7 is a bottom plan view of the fastening device as designed for attachment to the supporting structure through a substantially rectangular assembling opening;

Fig. 8 shows the fastener of Fig. 7 in edge elevation with the supporting structure represented in section;

Figs. 9 to 11 inclusive illustrate various blanks from which various forms of the fastening device may be constructed, Fig. 9 including an alternate form of thread engaging means in the fastener body;

Fig. 12 shows a further embodiment of the invention in which the fastening device is designed for use as a cable holding clip, or the like.

Referring now, more particularly, to the drawing, it will be readily understood that the improved fastening devices of the present invention are of general utility and may be readily designed for various installations in proportion to the size and contour of the parts secured. The devices are particularly suited for use in providing an apertured supporting structure with means for securing a cooperating part thereto entirely from one side thereof as required in a blind location for example, and in this relation, a preferred embodiment of the invention pertains to the provision of a fastening device having screw threaded fastener receiving means and otherwise comprising an attaching means designed to hold the fastening device in a self-retaining position on the supporting structure preparatory to the application of a threaded fastener thereto for securing a cooperating part to such supporting structure. In other installations, the fastening devices may be provided in the manner of substantial retainers for common threaded nuts or other retaining means for securing a cable, rod, tube, or other object or article of manufacture to be mounted on the supporting structure in a substantially locked fastening engagement under continuously effective spring tension.

Figs. 1 to 4 inclusive of the drawing shows a preferred embodiment of the invention in which a fastening device having a substantial locking plate portion 10 comprising means for threadedly engaging a bolt or screw is applied to fastening position at the rearward side of a supporting structure by an operation taking place entirely from the forward side thereof, preparatory to the application of the bolt or screw fastening thereto for securing a cooperating part to such supporting structure. The letter S, designates generally the supporting structure or other member carrying the nut fastening device and the same may be of any suitable material such as sheet metal, wood, fiber board, or the like; however, inasmuch as the instant invention is employed mainly in metallic structures, the same is usually in the form of a metallic panel or plate-like element provided with the necessary perforations along which the object or part to be secured thereto extends in mounted position thereon. In order to adapt the sheet metal supporting structure S for use with a fastening device of the present invention, a bolt passage 1 is provided therein together with an asembling opening or slot 2 at a point suitably spaced from said bolt passage. Such assembling opening is preferably a round hole or elongated substantially rectangular slot, and in any event, is of relatively simple outline and therefore may be provided at little added expense in the same punching operation by which the necessary bolt passage 1, would be provided ordinarily in such a nut fastening installation. Preferably, the bolt passage 1, is made of a size somewhat larger than necessary to receive the threaded fastener in order that the same may freely pass therethrough and be secured in any of several positions of adjustment as may be necessary or desirable.

A preferred form of the fastening device is constructed most economically from a relatively small, inexpensive blank of sheet metal such as represented in Fig. 6, which is best provided in the manner of a simple, rectangular section severed from standard strip stock without loss or waste of material whatsoever. Any suitable sheet metal may be employed but preferably of a spring metal nature such as spring steel or cold rolled steel having spring characteristics and otherwise of much greater tensile and compressive strength than the supporting structure with which the fastening device is employed. The fastening device, of course, may assume any desired shape or configuration but when in the form of such a rectangular section, is most practically suited for having a portion thereof prepared with integral bolt or screw thread engaging means in the substantial locking plate portion 10 adapted to receive a threaded fastening securing a cooperating part or object in an installation such as shown in Fig. 4.

Such thread engaging portion of the fastening device generally comprises end and bridge portions between which integral tongues 11, 12, or similar thread engaging elements are pressed, extruded or otherwise struck and formed to project out of the plane thereof for threadedly engaging a bolt or screw fastening substantially in the manner of a nut. The said bridge portions 13 provide what may be termed, the body of the locking plate device, which body is so formed in the stamping operation as to present a generally concave, resilient base from which the tongues extend upwardly in substantial ogee formation with the extremities thereof so spaced as to lie on a helix corresponding substantially to the pitch of the threads of the threaded fastener to be employed for most effective, uniform threaded engagement therewith in applied fastening position.

Such integral bolt or screw thread engaging means in the locking plate portion of the fastening device, of course, may be provided in any other suitable form or construction depending on the strength required and the use to which the device is put, so long as the elements thereof threadedly engage with the threaded fasteners as they are driven home. However, it has been found that such thread engaging means prepared in the form of cooperating tongues 11, 12, as shown, are the most efficient and most practical in that they are possessed of unusual inherent strength and will not collapse or pull through on tightening of the bolt, nor loosen from fully tightened position under constant stress, heavy usage and rough handling of an installation in which the fastening devices are used. This is possible by reason of the fact that the sheet metal material of the fastening device from which such tongues 11, 12 are formed, is of less thickness than the pitch or spacing of the screw threads and such tongues tend, more effectively, to move toward each other and dig into the grooves intermediate adjacent threads on tightening of the bolt or screw and otherwise become embedded in the root diameter of such threaded member in locked, frictional fastening engagement therewith in applied fastening position. At the same time, the generally arched base 13 of the locking plate portion is substantially flattened under tension in such applied fastening position, and in attempting to assume its initial, normally untensioned, generally concave configuration, naturally causes the tongues thereof to exert an axial drawing action on the shank of the threaded fastener to provide a tight, rigid fastening of the parts secured under continuously effective spring tension. Thus any vibration, jarring or strain taking place in a completed installation cannot cause displacement, reverse rotation or tend toward unscrewing of the threaded fastener from fully tightened fastening position; and it will be further appreciated that in the provision of such integral thread engaging elements in the fastening devices of the present invention, the use of individual threaded nuts or lock washers of any kind is entirely dispensed with, thereby making for a considerable saving not only in the cost of such nuts and lock washers, but also materially reducing the expense and labor involved in the tedious, time-consuming assembling operations which such fastenings require.

In addition to the thread engaging means 11, 12, of the fastening device, the fastener includes an attaching means designed to hold the same in self-retained position on the supporting structure preparatory to the application of a threaded fastener thereto for securing a cooperating part to such supporting structure. The attaching portion comprises, essentially, an extension 15 having a spring arm projecting from the fastener body adjacent one end thereof, and so designed as to cooperate with the body of the fastening device through the assembling opening 2, to hold the device in self retained position on the supporting structure. The spring arm is provided intermediate its length with a substantial shoulder 16 spaced from the adjacent upper face of the extension 15 a distance corresponding substantially to the thickness of the supporting part S in the area of the assembling opening 2. The spring arm preferably has its free end extending from the shoulder 16 in the manner of an inclined guide surface 17, and in the present example, is provided by an integral portion struck and formed from the extension 15, as will be readily understood from the blank outline represented in Fig. 6.

The fastener body otherwise is formed with an offset 20 of a size sufficient to accommodate the thickness of the support S, this offset being so spaced from the spring arm 16 as to cooperate therewith in retaining the fastening device in applied position in the assembling opening 2, as best seen in Fig. 3, wherein the device is illustrated as applied in a generally round opening in the supporting structure. In this relation, spaced abutments 21, 22 are presented at either end of said offset 20, Fig. 3, designed to engage at spaced points in the opening and otherwise cooperate with the spring arm shoulder 16 to retain the device in applied fastening position.

The body of the fastening device is preferably provided of a width corresponding to or slightly less than the diameter or width of the assembling opening, and in order to prevent the same from passing completely therethrough in the assembly thereof, ears 25, 26 are provided immediately adjacent the offset 20 to project beyond the side edges of the fastener body. Preferably such ears are provided in the manner of substantial nibs obtained by depressions on the flat faces of the fastener along the sides thereof thereby suitably deforming the longitudinal edges at spaced points in providing the desired ears or similar projections thereon.

Accordingly, with the fastener thus provided and the supporting structure prepared with a suitable bolt passage 1 and assembling opening 2 as shown in Fig. 3, the fastening device may be easily and quickly attached to substantial, positive locked assembled relation with the supporting structure simply by tilting or canting the fastener in the manner shown in Fig. 1 to insert the thread engaging portion 10 thereof through such opening in proximity to the bolt passage 1 at the rearward side of the supporting structure. The fastening device is then advanced longitudinally until limited by the offset 20 and the shoulders 21, 22 presented thereby, Figs. 1 and 3, it being understood that the fastener is prevented from passing completely through the assembling opening by the projecting ears 25, 26 immediately adjacent said offset. In this position in which further longitudinal movement of the fastener is limited by said offset 20, the leading end of the inclined guide surface 17 of the spring arm is also in position to be received in the assembling opening, whereupon pressure exerted on the extension 15 of the fastener body causes said guide surface 17 to cam against the adjacent side wall of the assembling opening and otherwise permits the shoulder 16 on the spring arm to pass through the opening to engage the edge of the opening and the immediately adjacent area at the rearward side of the supporting structure as shown in Figs. 2 and 3. Thus the abutments 21, 22 presented by the offset 20 cooperate with the shoulder 16 to engage at spaced points in the assembling opening to retain the fastening device in final applied fastening position and otherwise prevent endwise displacement or rotative shifting movement of the fastener from such applied position. In this relation, the shoulder 16 of the attaching spring arm is preferably designed to be disposed in substantial positive locked engagement at the rearward side of the supporting part to maintain the thread engaging means 11, 12 of the fastening device in suitable registration with the bolt passage 1. Such positive locked engagement of the attaching spring arm is preferable inasmuch as this arrangement eliminates any possibility of accidental displacement or reverse tilting movement of the thread engaging portion 10 of the fastening device from its final applied fastening position in overlying relation to the bolt passage 1, for receiving the bolt or screw fastening to be applied thereto. This is most important in facilitating the initial insertion of the bolt or screw fastening 28, Fig. 4, to threaded fastening engagement with the thread engaging elements 11, 12 of the fastening device in securing the cooperating part P to the supporting structure while in a blind location, such substantially fixed, non-rotative attachment of the fastener in self retained position on the supporting structure is usually absolutely essential since the rearward side of the supporting structure is not readily accessible and it becomes impossible or inconvenient for the operator to hold the fastening device while inserting and threadedly engaging the bolt fastening with the thread engaging means thereof.

Fig. 5 shows a further embodiment of the invention in which the fastening device is in the form of a retaining means for conventional threaded nuts usable in the manner of a substantial clinch-on nut device. An ordinary threaded nut is often required in a blind location wherein it is necessary that the nut be held in alignment with a bolt passage in the supporting structure by some extraneous means preparatory to the application of a bolt fastening thereto for securing a cooperating part to the supporting structure. In any event, the attaching portion 15 for the device may be substantially similar to that described with reference to Figs. 1–4 inclusive while the nut may be secured in registration with an aperture in the fastener body in any suitable way, as by welding or the like. In the preferred arrangement shown, the nut carrying portion 30 of the fastener is provided with an aperture into which an integral collar portion 31 of the nut 32 is received. Such collar is peened or riveted in the aperture in the nut carrying portion 30, as shown, to hold the nut firmly and rigidly thereon in the completed form of the fastener. The fastener may then be secured to the supporting structure S by means of its resilient attaching spring arm 16 applied through the assembling opening 2a in the general procedure already described to dispose said nut 32 in suitable registration with the bolt passage 1a in position to receive a bolt fastener to be applied thereto, the said collar 31 of the nut in such position preferably seating in the bolt passage and serving as a substantial indexing means preventing accidental displacement of the device from applied fastening position.

Figs. 7 and 8 show an arrangement whereby the attaching portion in any form of the fastening device is designed for use with an elongated assembling slot 3 in the supporting structure or nut carrying member S', substantially in the manner described with reference to Figs. 1–4 inclusive. In the use of such a generally rectangular assembling opening 3, the offset 20 in the fastener body is suitably spaced from the spring arm 16 according to the width of the slot and is otherwise designed for substantial abutting relation with the adjacent side wall 4 thereof. Thus the shoulder presented by said offset 20 cooperates with the spring arm 16 to prevent accidental displacement or undesirable shifting movement of the device from its final applied fastening position in which the thread engaging means 11, 12, thereof overlie the bolt passage in the support.

Figs. 9 to 11 inclusive represent outlines of blank stampings for various modified forms of the fastening device applied and used in substantially the manner of the previously described forms of the invention. From the blank 40 of Fig. 9, the attaching spring arm may be provided from an end projection 41 with the ears 42, 43 obtained by depressions in the fastener body to deform the metal at predetermined points on its longitudinal edges. The fastener blank otherwise is provided in the manner of the preferred form except for an alternate form of thread engaging portion which comprises a circular aperture 44 having a radial slot 45. The slot provides substantial tongues 46, 47 which may be bent out of the blank until the marginal edge of the aperture is caused to conform to the helix of a bolt or screw thread for uniform threaded engagement therewith. The provision of such thread engaging means or its equivalent in any form of the fastening device is fully contemplated by the present invention. Fig. 10 represents a blank 50 similar to Fig. 6 except for the ears limiting the longitudinal movement of the device in the assembly thereof, said ears being provided by suitable projections 51, 52 on the longitudinal edges of the fastener body. In the blank 60, Fig. 11, the shoulders 61, 62 are similarly provided with the attaching spring arm adapted to be provided from an integral slit portion 63 struck and formed from the fastener body.

Fig. 12 shows a further embodiment of the invention in which the fastening device is designed for mounting a cable, tube or rod member, R, or the like on a supporting structure. The essential spring arm attaching means 16, etc., is substantially similar to that shown and described with reference to Figs. 1–4 inclusive, while a suitable extension 70 on the fastener body is formed in the manner of a resilient leg member designed to clamp or otherwise hold the article to be attached to the support. The opposite end of the fastener body is provided with the usual thread engaging means 11, 12, and may include a return bend 71 providing a thread engaging element 72 for engaging a bolt thread other than that engaged by the said basic nut elements 11, 12, thereby providing for added strength in the completed mounting. In any event, such a cable or rod holding means embodying a bolt or screw threaded fastening 73, provides a mounting which not only is positively locked against inadvertent disconnection or accidental removal, but also, one in which the clip fastening device may be applied without access to the rearward side of the support by an operation taking place entirely from the forward side thereof, substantially as described in the embodiment of Figs. 1–4 inclusive.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a sheet metal body having a portion provided with means for threadedly engaging a bolt or screw threaded fastener, said portion being adapted to pass through an assembling opening in a part from one side thereof to fastening position at the other side of said part, means on said fastener body limiting the movement thereof to applied fastening position, and an attaching spring arm on said fastener body, said spring arm being adapted to extend through and engage in said assembling opening to retain the fastener in applied fastening position.

2. A fastener comprising a sheet metal body having a portion provided with means for threadedly engaging a bolt or screw threaded fastener, said portion being adapted to pass through an assembling opening in a part from one side thereof to fastening position at the other side of said part, means on said fastener body limiting the movement thereof to applied fastening position comprising a substantial abutment engaging a wall of said assembling opening, an attaching spring arm on said fastener body, said spring arm being adapted to extend through said assembling opening and including a substantial shoulder engaging therein to cooperate with said abutment in retaining the fastener in applied fastening position.

3. A fastener comprising a sheet metal body having a portion provided with means for threadedly engaging a bolt or screw threaded fastener, said portion being adapted to pass through an assembling opening in a part from one side thereof to fastening position at the other side of said part, an offset on said fastener body providing a substantial abutment adapted to engage a wall of said opening, ears projecting from the side edges of the fastener body for limiting the movement of the fastener body to applied fastening position, an attaching spring arm on said fastener body, said spring arm being adapted to extend through said assembling opening and engage a wall thereof in cooperative relation with said abutment in retaining the fastener in applied fastening position, said spring arm having a substantial shoulder adapted to engage a marginal edge portion adjacent said assembling opening in substantial positive locking relation therewith.

4. A fastener comprising a sheet metal body having a portion provided with means for threadedly engaging a bolt or screw threaded fastener, said portion being adapted to pass through an assembling opening in a part from one side thereof to fastening position at the other side of said part, an offset on said fastener body providing a substantial abutment adapted to engage a wall of said opening, ears projecting from the side edges of the fastener body for limiting the movement of the fastener body to applied fastening position, an attaching spring arm on said fastener body, said spring arm being adapted to extend through said assembling opening and engage a wall thereof in cooperative relation with said abutment in retaining the fastener in applied fastening position, said spring arm having a substantial shoulder adapted to engage a marginal edge portion adjacent said assembling opening in substantial positive locking relation therewith, and said fastener body having a section provided with means for securing an object to said part.

5. A fastening device comprising a sheet metal body provided with securing means for threadedly engaging a threaded fastener and means for attaching the fastening device on a supporting structure preparatory to the application of the threaded fastener thereto, said attaching means comprising a substantial spring arm adapted for substantial snap fastening engagement in an assembling opening in said supporting structure, said body of the fastening device provided with securing means being adapted to pass through said assembling opening and cooperate with said spring arm to retain the fastening device in applied position on the supporting structure in position for threadedly engaging a threaded fastener applied thereto for securing a cooperating part to said supporting structure.

6. A fastening device comprising a sheet metal body provided with securing means for threadedly engaging a threaded fastener and means for attaching the fastening device on a supporting structure preparatory to the application of the threaded fastener thereto, said attaching means comprising a spring arm on said body adapted to engage in an assembling opening in said supporting structure and cooperate with the fastener body to retain the device in applied fastening position thereon, said body of the fastening device provided with securing means being adapted to pass through said assembling opening in the application of said spring arm to attached relation with the supporting structure, said spring arm extending through said assembling opening and having substantial snap fastening engagement with a wall thereof to retain the fastening device in said applied fastening position with the thread engaging means thereof overlying a bolt passage in said supporting structure in position for threadedly engaging a threaded fastener applied thereto for securing a cooperating part to said supporting structure.

7. A fastening device comprising a sheet metal body provided with securing means for threadedly engaging a threaded fastener and means for attaching the fastening device on a supporting structure preparatory to the application of the threaded fastener thereto, said attaching means comprising a spring arm and abutment on the fastener body adapted to cooperatively engage in an assembling opening in said supporting structure, said body of the fastening device provided with securing means being adapted to pass through said assembling opening in the application of said spring arm and abutment to attached relation with the supporting structure, said abutment limiting movement of the fastening device to applied fastening position and said spring arm extending through said assembling opening and having substantial snap fastening engagement with a wall thereof to retain the fastening device in such applied fastening position with the thread engaging means thereof overlying a bolt passage in said supporting structure in position for threadedly engaging a threaded fastener applied thereto for securing a cooperating part to said supporting structure.

8. A fastening device comprising a sheet metal body carrying thread engaging means for receiving a threaded fastener and adapted to be inserted through an assembling opening adjacent a bolt aperture in a supporting part from one side thereof to fastening position at the opposite side thereof with said thread engaging means overlying said bolt aperture in the supporting part, an attaching portion of said sheet metal body adapted to extend through said assembling opening in such fastening position, and a yieldable element adapted for snap fastening action past an edge of said assembling opening to cooperate with said attaching portion for retaining the fastening device in said fastening position.

9. A fastening device comprising a sheet metal body carrying thread engaging means for receiving a thread fastener and adapted to be inserted through an assembling opening adjacent a bolt aperture in a supporting part from one side thereof to fastening position at the opposite side thereof with said thread engaging means overlying said bolt aperture in the supporting part, an attaching portion of said sheet metal body adapted to extend through said assembling opening in such fastening position, an abutment defined by said attaching portion and a yieldable element adapted for snap fastening action past an edge of said assembling opening to cooperate with said abutment for retaining the fastening device in said fastening position.

GEORGE A. TINNERMAN.